United States Patent [19]

Faure

[11] 3,901,085
[45] Aug. 26, 1975

[54] PIPETTE OR SIMILAR APPARATUS FOR MEASURING DETERMINED VOLUMES OF LIQUID

[76] Inventor: Jean Marie Faure, 28, Blvd. Aristide Briand, 91600 Savigny sur Orge, France

[22] Filed: Nov. 29, 1973

[21] Appl. No.: 420,163

[30] Foreign Application Priority Data
Nov. 30, 1972 France .............................. 72.42579

[52] U.S. Cl. ........................................... 73/425.4 P
[51] Int. Cl.² ........................................... B01L 3/02
[58] Field of Search ...................... 73/425.4 P, 425.6

[56] References Cited
UNITED STATES PATENTS

| | | | |
|---|---|---|---|
| 3,045,494 | 7/1962 | Gerarde | 73/425.6 |
| 3,741,732 | 6/1973 | Stanfield | 73/425.4 P |
| 3,783,696 | 1/1974 | Coleman | 73/425.4 P |

*Primary Examiner*—S. Clement Swisher
*Attorney, Agent, or Firm*—Haseltine, Lake & Waters

[57] ABSTRACT

A pipette or similar measuring instrument for determined volumes of liquid comprising two conduit portions connected in end-to-end sealed relation to form a composite pipe sealably engaged in a receptacle which can be selectively evacuated or pressurized. One conduit portion is wettable by the liquid and the other is non-wettable thereby.

8 Claims, 2 Drawing Figures

PIPETTE OR SIMILAR APPARATUS FOR MEASURING DETERMINED VOLUMES OF LIQUID

FIELD OF THE INVENTION

The invention relates to the fabrication of pipettes, burettes and other apparatus of this type for measuring determined liquid volumes by the conventional principle commonly referred to as "overflow" as will be described later.

PRIOR ART

In the present state of the art the conduits serving for the production of pipettes are realized as one single piece, and for their fabrication, a single material is used. This mode of fabrication presents major inconveniences in the precision of measuring as will be explained later.

SUMMARY OF THE INVENTION

An object of this invention is to eliminate the inconveniences associated with the conventional measuring apparatus by the employment of at least two selected materials and according to the invention, one is wettable by the liquid to be measured whereas the other is not. The pipette thus constructed comprises at least two coupled conduit portions, one of material wettable by the liquid to be measured, the other being non-wettable by this liquid.

One embodiment of this invention will next be described in respect of the following non-limitative example with reference to the annexed drawings.

DETAILED DESCRIPTION

Figure 1:
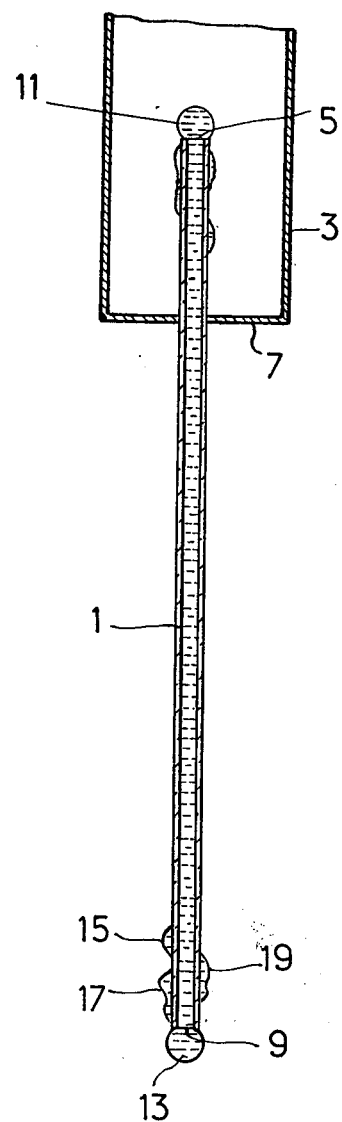
FIG. 1 is a longitudinal sectional view of a conventional pipette illustrating the principle of measuring by "overflow.

With reference to FIG. 1, a pipette is shown which comprises a conduit 1 connected in liquid-tight manner to an enclosure 3 such that an extremity 5 of the conduit 1 projects above the bottom 7 of enclosure 3. The enclosure 3 is itself connected to a conventional means (not shown) which is capable of creating in enclosure 3, either a suction or a pressure, as desired.

The measuring operation is effected in three steps:

In the first step, the extremity 9 of the conduit 1 is immersed in the liquid from which a determined volume is to be extracted and a vacuum is produced in enclosure 3 so that the conduit 1 is completely filled and overflow liquid is deposited onto the bottom 7 of the enclosure.

In the second step, the suction is eliminated, and the extremity 9 of the conduit 1 is withdrawn from the liquid in which it is immersed.

In the third step, the extremity 9 is placed above a receptacle adapted to collect the liquid to be measured, and a pressure is developed in the enclosure 3. The liquid contained in the conduit 1 is then evacuated through the extremity 9 of this conduit and theoretically a volume equal to the interior volume of the conduit 1 is available to be measured.

In the case where the liquid to be measured wets the material utilized in the construction of the pipette, in the second step of the operation, at the extremity 5 of the conduit 1, a drop 11, existing at the end of aspiration is aspirated by capillary forces formed by the external wall of the extremity 5 of the conduit 1 and the surface of the liquid at the level of this extremity 5. At the lower extremity 9 of the conduit 1 a drop of liquids 13 is retained and several drops of liquid 15, 17, 19 adhere to the walls of the conduit 1. The liquid is relatively adherent to the utilized materials and is maintained by surface tension so as to be absolutely retained. In the third step the drop 13, entraining with it an undetermined part of drops 15, 17 and 19 is itself entrained by the evacuated liquid. At the end of evacuation, some liquid filling the pipette remains as drops of liquid adherent to the interior wall of the conduit 1. All this introduces errors which are indeterminate and can represent either an excess or a deficiency in the measured amount.

In the case where the liquid to be measured does not wet the material utilized for the construction of the pipette, in the second step of the operation, the drop 11 not aspirated by the capillary forces stays in place. At the extremity 9 of the conduit 1 none of the drops 13, 15, 17, 19 adheres to conduit 1. The liquid which is very mobile with respect to the utilized material tends to be displaced either towards the top where it is removed from the liquid in conduit 1 or it is displaced towards the bottom where it is removed from the liquid in conduit 1.

The operation is therefore extremely delicate and is subject to significant errors.

In the third step of the operation, the drop 11, of undetermined volume is evacuated with the liquid to be measured, but, at the end of the discharge, no liquid adheres to the interior of conduit 1.

Figure 2:
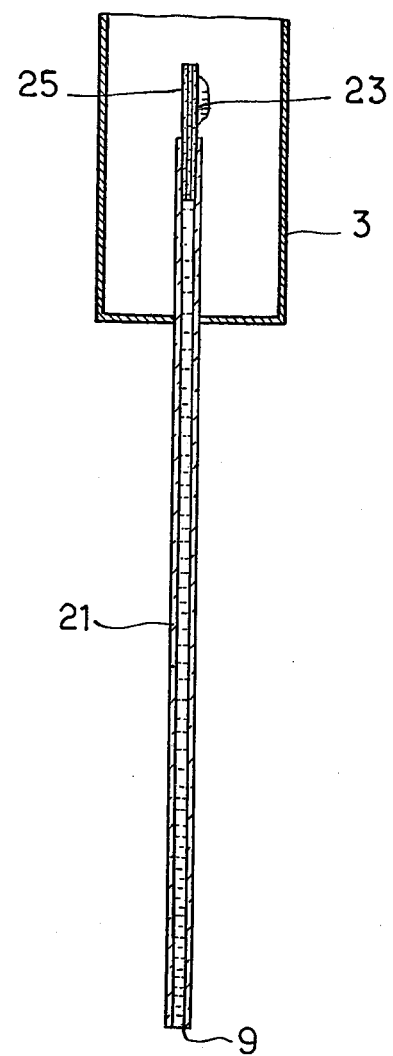
" and FIG. 2 is a corresponding longitudinal sectional view of a pipette according to the invention.

According to the invention, the totality of these measuring errors is eliminated by constructing the pipette of at least two conduit portions 21 and 23 connected in end-to-end relation as seen in FIG. 2. The conduit 23 is made of a material which is wettable by the liquid to be measured, for example, glass and the conduit 21 is made of material which is non-wettable by the liquid to be measured, for example, polytetra fluorethylene.

The sealed connection of the conduit portions 21 and 23 can be effected in any suitable manner, such as by the use of fasteners, by welding, or by adhesives or the like. The conduit portions are telescoped as shown and secured together in sealed fashion. The connection between the conduit portions is disposed within enclosure 3 and portion 21 is substantially longer than portion 23.

In the second step of the operation there is thus obtained:

A perfect liquid surface at the level of extremity 25 without any formation of drop 11.

No adhering of drops 13, 15, 17 or 19 on conduit portion 21.

A perfect stability of the liquid is obtained in the pipette due to the capillary force at the level of conduit 23.

In the third step of the operation, there is produced a perfect discharge of the liquid in the pipette. All the causes of errors are eliminated and the volume of the evacuated liquid is now exactly equal to the interior volume of the pipette.

What is claimed is:

1. Apparatus for the measure of determined volumes of liquid by the overflow method, said apparatus comprising a receptacle, a conduit sealingly secured in said receptacle and including first and second conduit portions assembled in end-to-end sealed relation and having respective open ends, said first conduit portion extending into said receptacle and being constituted of a material which is wettable by the liquid to be measured, said second conduit portion extending outside said receptacle and being constituted of a material which is non-wettable by said liquid.

2. A conduit as claimed in claim 1 wherein said receptacle is adapted for being subjected to suction or pressure.

3. A conduit as claimed in claim 2 wherein the end-to-end connection of the conduit portions is located within said receptacle.

4. A conduit as claimed in claim 3 wherein said conduit portions are telescoped where they are connected in end-to-end relation.

5. A conduit as claimed in claim 1 wherein the material of said first conduit portion is glass.

6. A conduit as claimed in claim 1 wherein the material of said second conduit portion is polytetrafluoroethylene.

7. A conduit as claimed in claim 1 wherein said second portion is substantially longer than the first portion.

8. Apparatus as claimed in claim 3 wherein said first conduit portion is disposed in entirety in said receptacle, said second conduit portion being sealingly secured in said receptacle.

* * * * *